United States Patent [19]

Verstraete et al.

[11] Patent Number: 4,696,747
[45] Date of Patent: Sep. 29, 1987

[54] PROCESS FOR THE ELIMINATION OF NITRATES BY MEANS OF A MICROBIOLOGICAL CONVERSION IN THE PRESENCE OF HYDROGEN GAS

[75] Inventors: Willy Verstraete, Wondelgem; Jozef De Ley, Deurle, both of Belgium

[73] Assignee: Ateliers de Constructions Electriques de Charleroi (ACEC) Societe Anonyme, Brussels, Belgium

[21] Appl. No.: 832,758

[22] Filed: Feb. 25, 1986

[30] Foreign Application Priority Data

Feb. 25, 1985 [EP] European Pat. Off. ......... 852002492

[51] Int. Cl.⁴ .................................................. C02F 3/30
[52] U.S. Cl. ..................................... 210/605; 210/603; 210/611; 210/617; 210/150; 210/903; 435/168
[58] Field of Search ............... 210/610, 611, 903, 617, 210/618, 150, 151, 188, 605, 603; 435/168, 842

[56] References Cited

U.S. PATENT DOCUMENTS

| | | | |
|---|---|---|---|
| 4,179,374 | 12/1979 | Savage et al. | 210/903 |
| 4,183,809 | 1/1980 | Klapwijk et al. | 210/605 |
| 4,384,956 | 5/1983 | Mulder | 210/903 |
| 4,419,243 | 12/1983 | Atkinson et al. | 210/618 |
| 4,469,599 | 9/1984 | Gros et al. | 210/903 |

FOREIGN PATENT DOCUMENTS

| | | | |
|---|---|---|---|
| 86863 | 8/1983 | European Pat. Off. | 210/610 |
| 2476629 | 8/1981 | France | 210/903 |
| 57-60918 | 12/1982 | Japan | 210/903 |
| 59-187784 | 10/1984 | Japan | 435/168 |

OTHER PUBLICATIONS

Ginocchio J. C.; "Biological Denitrification of Drinking Water"; Sulzer Technical Review; pp. 115–117 (3/1980).
Karube J. et al., "Photochemical Fuel Cell Using Immobilized Chloroplast-*Clostridium-Butyricum*"; Advances in Biotech., vol. III, pp. 389–394 (Jul. 1980).

*Primary Examiner*—Benoit Castel
*Attorney, Agent, or Firm*—Schwartz, Jeffery, Schwaab, Mack, Blumenthal & Evans

[57] ABSTRACT

In a microbiological process for the elimination of nitrates from an aqueous liquid, the liquid to be denitrified passes through a first reaction zone containing a denitrifying biomass which utilizes hydrogen and into which hydrogen gas is injected. Effluent from the first reaction zone is introduced into a second reaction zone containing a nitrifying biomass which is also contacted by an oxygen-containing gas.

19 Claims, 1 Drawing Figure

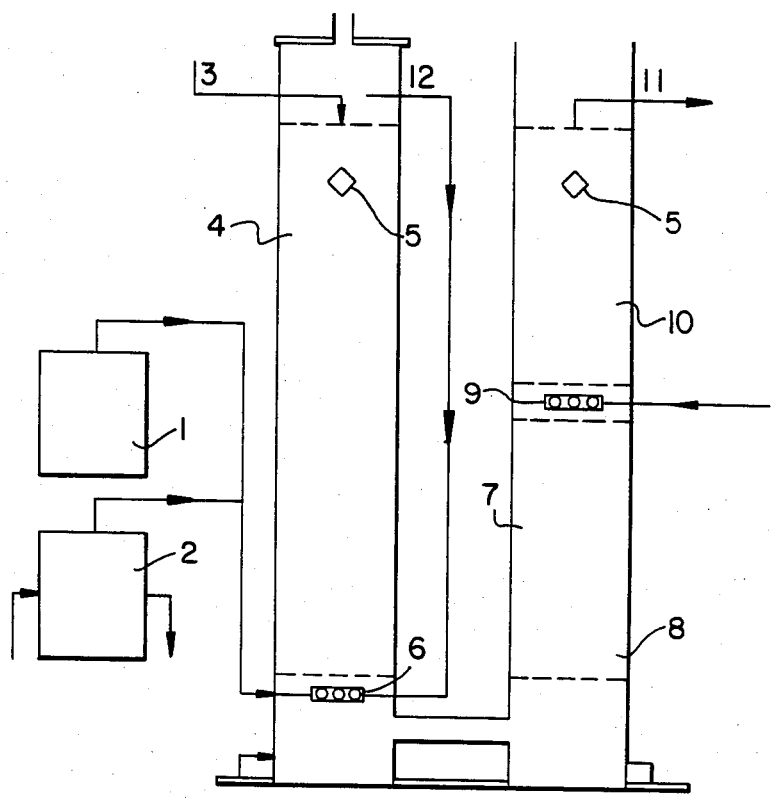

4,696,747

PROCESS FOR THE ELIMINATION OF NITRATES BY MEANS OF A MICROBIOLOGICAL CONVERSION IN THE PRESENCE OF HYDROGEN GAS

BACKGROUND OF THE INVENTION

Processes for the elimination of nitrates from water by denitrification in microbiological reactors are already known. Such processes, carried out in rising current reactors containing a granular denitrifying biomass, have been described, for example, by Lettinga et al, *Biotechnol. Bioeng.* 22: 699–734 (1980), and by Timmermans, "Kinetics and Guidelines for the Design of Biological Denitrification Systems of Water" (1983 doctoral thesis; Catholic University at Louvain, Belgium).

For waste waters in particular, different reducing agents such as sugars, less expensive biodegradable organic material, and cellulose have been used, as have ethanol and methanol. For potable water, however, only the latter two have been used. All of these conventional reducing agents present the disadvantage that they dissolve in water and cause reduction in the quality of the potable water produced they must therefore be eliminated, by means of an additional, more expensive process at the end of the denitrification process.

One known denitrification process for potable water utilizes hydrogen, as described by Gros et al (1982) "Nitratentfernung aus dem Trinkwasser. Untersuchung von drei Verfahren in einer Pilotanlage in Zollikofen," Kurzbericht Gebr. SULZER (June, 1982).

According to this process, hydrogen gas is used as a reducing agent. Gaseous hydrogen is introduced at the bottom of a reactor and diffuses toward the top in the interior of the reactor. Water is displaced in the same direction. The biomass responsible for the denitrification process is retained in the interior of the reactor on mixing elements which take the form of small disks. While employing hydrogen as the reducing agent, this process does not permit the use of increased biomass densities, and allows a small but unacceptable quantity of nitrites to remain in the potable water.

BACKGROUND OF THE INVENTION

It is therefore an object of the present invention to provide a denitrification process which is economically practical and which employs hydrogen, a non-polluting reducing agent, while eliminating noxious nitrated intermediates.

It is also an object of the present invention to provide an apparatus specifically adapted for implementing the aforesaid process.

In accomplishing the foregoing objects, there has been provided, in accordance with one aspect of the invention, a microbiological denitrification process comprising the steps of (a) directing an aqueous stream comprising at least one nitrate into contact with a first denitrifying biomass which is also contacted by hydrogen gas, the denitrifying biomass having an affinity for hydrogen, and then (b) directing the aqueous stream into contact with a nitrifying biomass, such that at least one nitrogenous component in the aqueous stream is converted to nitrate. In a preferred embodiment, the nitrifying biomass is contacted with a fluid containing oxygen or at least one constituent which, upon contact with the aqueous stream, releases oxygen, the fluid coming from a direction which parallels the direction of the aqueous stream.

In accordance with another aspect of the present invention, there has been provided an apparatus for microbiological denitrification comprising:

(a) a first reaction zone containing a first denitrifying biomass in a volume of fluid, the first biomass having an affinity for hydrogen;

(b) means for contacting the first denitrifying biomass with hydrogen gas;

(c) means for contacting the first denitrifying biomass with a aqueous stream comprising at least one nitrate; and (d) a second reaction zone containing a nitrifying biomass in a volume of fluid, the second reaction zone being in communication with the first reaction zone.

In a preferred embodiment, the first and second reaction zones are contiguous, while in another embodiment they are provided in separate reactors which communicate by conduit means.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF PREFERRED EMBODIMENTS

The nitrate elimination process of the present invention can be applied in treating any aqueous liquid, and is preferably employed to treat water that is intended for use as potable water. Nitrates to be removed from a liquid can be present in a concentration of between 10 and 1000 mg nitrogen per liter. Preferably, the nitrate material in a liquid to be treated using the present invention does not comprise, or only slightly comprises, solid particles in suspension. The liquid to be denitrified may, but need not, contain dissolved mineral substances or dissolved, biodegradable organic substances.

Throughout this description of the present invention the phrase "biomass" is used to refer to a mass seeded with, and capable of supporting, a culture of microorganisms that possess denitrifying ("denitrifying biomass") or nitrifying ("nitrifying biomass") properties. The state of the art regarding denitrifying and nitrifying biomasses is evidenced by Focht and Verstraete, "Biochemical Ecology of Nitrification and Denitrification," in 1 ADVANCES IN MICROBIAL ECOLOGY 135–214 (1977), the contents of which are hereby incorporated by reference.

The present invention will be further described with reference to the embodiment of the present invention depicted in FIG. 1.

Gaseous hydrogen produced by a chemical or physical process is accumulated in reservoir 1, and/or is produced by biological fermentation in a fermenter 2, to be used eventually in a subsequent liquid-purification phase. The water or aqueous liquid (hereafter termed "water") to be denitrified is introduced by means of a conduit 3 in the upper part of cell 4 in a first reactor. The water descends in this reactor at a selected speed, typically between about 0.1 and 30 meters per hour. Supports 5 for a denitrifying biomass are immersed in the liquid in the cell 4. The supports are preferably comprised of reticulated polyurethane, but other supports which provide a high surface-to-volume ratio and significant porosity can be used. The ratio of support surface (in square meters) per unit of reactor volume (in cubic meters) is preferably greater than 1000, and should at least be about 100.

The hydrogen provided from reservoir 1 and/or fermenter 2 is injected at the bottom of cell 4, which comprises a first reaction zone. The hydrogen can be introduced, through tuyeres 6 as shown or, for example, through a plate of sintered steel or glass. The hydrogen gas rises in countercurrent fashion to the nitrate-containing water descending through the first reactor. The fact that the hydrogen travels in countercurrent to the water has the advantage that gas liberated by the microbiological reactions drive out the dissolved oxygen from the arriving fresh water. In the resulting, increasingly anaerobic environment, the microorganisms of the denitrifying mass must break down the nitrates to obtain the oxygen which is necessary for metabolic purposes. The hydrogen that passes through the nitrate-containing water is then reinjected to the bottom of cell 4 through tuyeres 6 by means of conduit 12.

The water, arriving at the base of cell 4 already strongly denitrified, is sent into cell 7, which can be in a second reactor. In cell 7, the water preferably crosses a reaction zone 8, although in certain embodiments of the present invention zone 8 is omitted, as described in greater detail below. The water thereafter arrives in an aeration zone 10, also referred to hereafter as the "second reaction zone." This zone is located above a diffuser 9, where an oxygen-containing gas, such as air, is introduced, and the upper part of cell 7. Zone 10 contains a nitrifying biomass which comprises, for example, organoaerobic bacteria and/or chemolitotrophic aerobic bacteria. In second reaction zone 10, air introduced by diffuser 9 permits growth of the nitrifying biomass fixed on supports 11, which can be identical to the supports 5 for the denitrifying biomass in cell 4 of the first reactor. The nitrifying biomass in the aeration zone 10 effects the elimination of both noxious nitrated intermediates and the residue of organic material. The rate of aeration, which is defined by the quantity of air entering through diffuser 9, is selected so that the liquid leaving zone 10 contains at least 4 mg/l of dissolved oxygen. In place of gas, a fluid can be used that contains free oxygen or oxygen in a form (ozone, $H_2O_2$, etc.) which, upon contact with the influent from zone 10, releases gaseous oxygen.

In the embodiment of the present invention shown in FIG. 1, the liquid in cell 7 follows an ascending path, and in the second reaction zone 10 the oxygen or the air circulates in the same direction as the liquid. But is possible, and in certain cases advantageous, likewise to feed the second reaction zone from above, thereby obtaining a countercurrent movement between the oxygen and the liquid.

In FIG. 1, the liquid to be denitrified is sent from cell 4 into zone 8 of cell 7. Zone 8 can be considered a third reaction zone where residual hydrogen is entirely consumed. Zone 8 contains a denitrifying biomass which, as in the first reaction zone cell 4, can be fixed on supports (not shown); alternatively, the denitrifying biomass can take the form of a layer of sediment which is traversed by the rising currents in zone 8, so long as those currents are sufficiently slow to avoid turbulence. In either case, conditions are produced that permit different configurations and assemblages advantageous for denitrifying microorganisms.

In a variation on the embodiment of the present invention shown in FIG. 1, a third reactor comprising zone 8 can be positioned, in accordance with the present invention, at the bottom of cell 4, below the hydrogen diffuser 6, or in an independent cell (not shown). When such a third reactor is used, it is preferable to pressurize the first and second reactors, and to cause the third reactor to function at a slightly lower pressure than that of the first and second reactors, respectively.

The first reactor comprising cell 4, as shown in FIG. 1, can function at temperatures between about 5° C. and 40° C., and at a pH between about 5 and 10. Although the water to be denitrified need not contain dissolved mineral salts, the addition of mineral salts, and in particular salts containing phosphorous, is very useful in the preparatory phase for the functioning of the reactor. Mineral salts are preferably added in amounts sufficient to provide nutrient to bacteria comprising the denitrifying biomass. During the preparatory phase, it is also preferred that the denitrifying biomass is seeded, preferably with a culture comprised predominantly of Alcaligenous eutrophic bacteria added to the water. Pseudomonad bacterial species can also be used in the seed culture for the denitrifying biomass, *Pseudomonas denitrificans* and *Micrococcus denitrificans* being particularly preferred for this purpose.

On the other hand, the nitrifying zone 10, as the second reaction zone, is seeded with an enriched inoculum of nitrifying bacteria obtained, for example, from soil or surface water. For seeding of the nitrifying biomass in zone 10, bacteria of the genus Nitrobacter are preferred.

In the normal functioning of the installation shown in FIG. 1, the denitrification of potable water is generally accomplished after 30 to 600 minutes of circulation through the different reaction zones. At influent rates of about 0.5 kg nitrogen (in the form of nitrates) per cubic meter of first-reactor volume per day, approximately 90% of the nitrate-related nitrogen can be eliminated via treatment in accordance with the present invention.

The depth of diffuser 6 with respect to the upper level of the liquid in cell 4 is chosen as a function of the desired absorption rate of the hydrogen gas, which rate is preferably greater than at least 50%. The hydrogen which is used in the denitrification process of the present invention can come from a carboy provided with a pressure reducer which releases the gas, preferably at a pressure of about 1.5 atmospheres, at the bottom of the first reactor, which typically is about 2 meters in height.

According to one particular example of the present invention, a reactor assembly as shown in FIG. 1 functioned at a rate of 10 m³ per cubic meter of first-reactor volume per day. Tap water at 15° C., containing 50 mg nitrogen in the form of nitrates per liter, was treated in the first reactor (cell 4) at a rate of 0.5 kg of nitrite-related nitrogen per cubic meter of reactor volume per day. The quantity of denitrifying biomass, which was fixed on polyurethane supports, was 20 grams of dry weight per liter of reactor volume. With gaseous hydrogen diffusing toward the top of the reactor with an absorption rate of 17%, a 90% transformation of the nitrates into nitrogen gas was achieved. Upon entry into zone 8, which contained the same biomass as in zone 4, the water still contained 5 mg of nitrate-related nitrogen per liter. This concentration can be reduced, by means of hydrogen dissolved in the water, to 1 mg of nitrate-related nitrogen per liter.

As previously indicated, the aeration by diffuser 9 permits the nitrifying biomass in reaction zone 10 to eliminate nitrated intermediates, notably nitrites and ammoniacal nitrogen. In the exemplary reactor assembly discussed above, the capacity for elimination of nitrogen in the form of nitrates was approximately 0.4 kg per cubic meter of first reactor volume, or 80%, when the total time of passage through the installation was about 140 minutes.

In one preferred embodiment of the present invention, hydrogen provided by a biological fermenter is used, even if the gas from the fermenter does not contain hydrogen alone. It is preferred that the gas furnished by the fermenter primarily contains hydrogen, optionally with carbonic acid anhydride and very few other gases. For example, one suitable fermenter employs *Clostridium butyricum* to decompose biopolymers or sugars into hydrogen, $CO_2$ and organic acids such as lactate, acetate, and butyrate; the hydrogen can be used in the present invention at a rate of 11 m$^3$ per cubic meter of fermenter volume. When hydrogen-containing gas produced by the aforesaid Clostridium fermenter is utilized in the denitrification process of the present invention, at a temperature of about 20° C. and a circulation time of 50 minutes, to treat surface water which contains 20 mg of nitrate-related nitrogen per liter, the effluent from zone 10 contains a residuum of 4 mg of nitrate-related nitrogen per liter.

To provide hydrogen for use in the present invention, lactate, acetate and butyrate can be transformed into hydrogen by cultures of photosynthetic bacteria at rates between about 0.1 to 0.9 $m^3$ $H_2$ per cubic meter of a fermentor volume per day, with a yield between 23 and 100%.

According to another variation suitable for use with the present invention, a system of two fermenters can be employed to take advantage of a carbohydrate, like lactoserum, which is transformed entirely into hydrogen. In such a system, the first fermenter contains a Clostridium strain (e.g., of *C. butyricum, C. pasteurianum, C. butylicum, C. acetobutylicum, C. tyrobutyricum, C. beijerinckii, C. bifermentans, C. oceanicum* or *C. oroticum*) which functions in darkness to convert lactose or other carbohydrate into hydrogen, carbonic acid anhydride and fatty acids. In a second fermenter, the fatty acids are transformed into hydrogen via photofermentation effected by *Rhodobacter capsulatus, Rhodospirillum rubrum* or *Rhodomicrobium vanniellii.* The gas phases of the two fermenters are utilized simultaneously in the denitrification process of the present invention.

In certain cases, a substantial flow of hydrogen can be injected through tuyeres 6 and collected above the level of liquid in cell 4. Hydrogen thus collected can be purified by elimination of undesirable gases, for example, using commercially available, semipermeable membranes, and reinjected through tuyeres 6.

The installation shown in FIG. 1 can include a disinfecting apparatus, not shown, employing ozone, chlorine or ultraviolet light as well as other disinfecting agents. The effluent from cell 4 can be channeled through such a disinfecting apparatus.

It is possible in accordance with the present invention to bring the influent to the bottom of reaction zone 4, and to position the denitrifying biomass in that reactor, for example, on particles that form a fluidized bed under the action of the rising current of influent and hydrogen gas. In this case, the movement of the liquid must be relatively rapid. It may be advantageous, therefore, to recycle the liquid in the reaction zone 4 towards the entrance point of the influent, so as to obtain the desired average residence time for the influent in zone 4.

In embodiments of the present invention involving an upwardly-directed influent flow, the different reaction zones can be located in the same cell. Such a single-cell configuration can also be employed when the influent follows a descending path through the different reaction zones.

The present invention provides aqueous liquids that are substantially totally free of obnoxious nitrogenous components, even in very small quantities, such liquids being suitable for consumption as potable water. This result is obtained by the transformation into nitrates of all of the nitrogenous components which are by-products of the predictable denitrification in the first reaction zone.

What is claimed is:

1. A microbiological denitrification process consisting essentially of the steps of (a) directing an aqueous stream comprising at least one nitrate into contact with a first denitrifying biomass contained in a cell, said denitrifying biomass having an affinity for hydrogen and also being contacted by hydrogen gas introduced as a gas into said cell, wherein a portion of said hydrogen gas is recycled for use in subsequent denitrification via said process; (b) directing said aqueous stream into contact with a second denitrifying biomass, such that hdyrogen introduced into said stream during step (a) is consumed and then (c) directing said aqueous stream into contact with a nitrifying biomass which is also contacted with a fluid containing oxygen or at least one constituent which, upon contact with said aqueous stream, releases oxygen, such that all nitrogenous components in said aqueous stream are converted to nitrate to produce potable water.

2. A process according to claim 1, wherein step (a) comprises bringing said hydrogen gas into contact with said denitrifying biomass from a direction which is opposite the direction of said aqueous stream, whereby said hydrogen gas and said aqueous stream are oriented in countercurrent relation.

3. A process according to claim 1, wherein step (a) comprises bringing said hydrogen gas into contact with said denitrifying biomass from a direction which parallels the direction of said aqueous stream.

4. A process according to claim 1, wherein step (b) comprises bringing said fluid into contact with said nitrifying biomass from a direction which parallels the direction of said aqueous stream.

5. A process according to claim 1, wherein step (b) comprises bringing said fluid into contact with said nitrifying biomass from a direction which is opposite to the direction of said aqueous stream.

6. A process according to claim 1, wherein said second denitrifying biomass comprises bacteria selected from the group consisting of an Alcaligenous eutrophic strain, *Pseudomonas denitrificans* and *Micrococcus denitrificans.*

7. A process according to claim 1, wherein steps (b) and (c) are carried out in contiguous reaction zones.

8. A process according to claim 7, wherein step (a) is carried out in a reaction zone that is not contiguous with the reaction zones for steps (b) and (c), respectively.

9. A process according to claim 1, wherein said nitrifying biomass comprises organoaerobic bacteria and/or chemolitotropic aerobic bacteria.

10. A process according to claim 1, wherein said nitrifying biomass comprises bacteria of the genus Nitrobacter.

11. A process according to claim 1, wherein said first denitrifying biomass comprises bacteria selected from the group consisting of an Alcaligenous eutrophic strain, Pseudomonas denitrificans and Micrococcus denitrificans.

12. Apparatus for microbiological denitrification, consisting essentially of:
   (a) a first reaction zone containing a first denitrifying biomass in a volume of fluid, said biomass having an affinity for hydrogen;
   (b) means fluidly connected to a source of hydrogen gas for contacting said first denitrifying biomass with hydrogen gas;
   (c) means for contacting said first denitrifying biomass with an aqueous stream comprising at least one nitrate;
   (d) a second reaction zone containing a nitrifying biomass in a volume of fluid, said second reaction zone being in communication with said first reaction zone;
   (e) means for contacting said nitrifying biomass with a fluid containing oxygen or at least one constituent which, upon contact with said aqueous stream, releases oxygen;
   (f) means for withdrawing treated effluent from the second reaction zone;
   (g) inlet means for introducing a nitrate-containing fluid into said first reaction zone;
   (h) a third reaction zone in communication with both of said first and second reaction zones, said third reaction zone containing a second denitrifying biomass in a volume of fluid; and
   (i) means for recycling hydrogen gas from said first reaction zone to use in contacting said first denitrifying biomass.

13. Apparatus according to claim 12, wherein said first and second reaction zones are contiguous.

14. Apparatus according to claim 12, wherein said first and second reaction zones are each provided in separate reactors, there being conduit means for communicating between said reactors.

15. Apparatus according to claim 12, wherein said first and third reaction zones are contiguous.

16. Apparatus according to claim 12, wherein said second and third reaction zones are contiguous.

17. Apparatus according to claim 12, wherein said first, second and third reaction zones are each provided in a separate pressurized reactor, the reactors containing said first and second reaction zones each being maintained at pressures greater than the pressure maintained in the reactor containing said third reaction zone.

18. Apparatus according to claim 17, wherein said first reaction zone is not contiguous with said second or third reaction zones.

19. Apparatus according to claim 12, wherein means (b) comprises a fermenter containing at least one culture of bacteria selected from the group consisting of *Rhodobacter capsulatus, Rhodospirillum rubrum, Rhodomicrobium vannielii,* and a species of genus Clostridium.

* * * * *